United States Patent [19]

Zwolinski et al.

[11] Patent Number: 4,713,400

[45] Date of Patent: Dec. 15, 1987

[54] FOAMING SYSTEM FOR PHENOLIC FOAMS

[75] Inventors: Leon M. Zwolinski, Orchard Park; Frank J. Dwyer, Buffalo, both of N.Y.

[73] Assignee: Allied Corporation, Morris Township, Morris County, N.J.

[21] Appl. No.: 864,657

[22] Filed: May 19, 1986

Related U.S. Application Data

[62] Division of Ser. No. 811,185, Dec. 20, 1985.

[51] Int. Cl.$^4$ ................................................. C08J 9/14
[52] U.S. Cl. ......................................... 521/131; 521/98; 521/181; 521/910
[58] Field of Search ................... 521/131, 181, 910, 98

[56] References Cited

U.S. PATENT DOCUMENTS

| | | | |
|---|---|---|---|
| 4,419,460 | 12/1983 | Ho | 521/181 |
| 4,423,163 | 12/1983 | Doerge | 521/181 |
| 4,424,289 | 1/1984 | Meyer | 521/181 |
| 4,525,492 | 6/1985 | Rastall | 521/181 |
| 4,530,939 | 7/1985 | Rickle | 521/181 |
| 4,539,338 | 9/1985 | Carlson et al. | 521/181 |

*Primary Examiner*—Morton Foelak
*Attorney, Agent, or Firm*—Jay P. Friedenson

[57] ABSTRACT

A mixture of CFC-113 and CFC-123 and/or CFC-123a where CFC-123 or CFC-123a is a significant portion of the total composition has been found to result in improved blowing agent performance in phenol-formaldehyde foams compared to CFC-113.

The use of CFC-123 (or CFC-123a, or both), in combination with CFC-113 improves resole resin solubility and mixed ingredient solution stability, prior to foaming. In addition, because of the lower molecular weight of CFC-123 (or CFC-123a) compared to CFC-113 better blowing agent efficiency will be realized per unit weight. Also, the lower boiling points of CFC-123 and CFC-123a as compared to CFC-113 results in a more ready conversion of dissolved blowing agent to released gaseous blowing agent by the exothermic phenolic resin polymerization. And because of the lower molecular weight and lower boiling point factors, a lower density foam is realized.

3 Claims, No Drawings

FOAMING SYSTEM FOR PHENOLIC FOAMS

This application is a division of application Ser. No. 811,185 filed Dec. 20, 1985.

This invention relates to improved rigid foam systems and more particularly to an improved blowing system for phenolic foams comprising fluorocarbon blowing agents composed of blends of trichlorotrifluoroethane (CFC-113) with dichlorotrifluoroethane (CFC-123) or CFC-123a (position isomer of dichlorotrifluoroethane) which impart significant improvement in the solubility characteristics of the rigid phenolic foam system.

BACKGROUND OF THE INVENTION

The general composition and method of preparing phenolic foam are well known. Generally, a foamable phenolic resole composition is prepared by admixing aqueous phenolic resole, blowing agent, surfactant, optional additives and an acid curing agent into a substantially uniform composition. The curing catalyst is added in amounts sufficient to initiate the curing reaction which is highly exothermic. The exotherm of the curing reaction vaporizes and expands the blowing agent thereby foaming the composition. The foaming process is preferably performed either in free-rise or closed mold type operations.

The general method for the continuous manufacture of phenolic foam insulation board generally involves preparing a foamable phenolic resole composition by continuously feeding into a suitable mixing device the aqueous phenolic resole, blowing agent, surfactant, optional additives, and acid curing catalyst. The ratio of these ingredients is adjusted depending on the density, thickness, etc. desired in the final product. The mixing device combines these ingredients into a substantially uniform composition which is continuously applied evenly onto a moving substrate, usually a protective covering such as cardboard, which adheres to the foam. The foaming composition is usually covered with another protective covering such as cardboard which becomes adhered to the phenolic foam. The covered foaming composition is then passed into a double belt press type apparatus where the curing exotherm continues to vaporize and expand the blowing agent, thereby foaming the composition as it is cured.

In the preparation of foams of this kind, one of the important objectives is to obtain foams that have a relatively low density and are homogeneous in cross section. The result often depends on the extent of dissolution in the foamable resin, and the ready conversion, of the dissolved blowing agent which provides the gaseous blowing medium. When fluorocarbons are used as blowing agents, a problem may arise because of insufficient solubility of the blowing agent in the resin or from the compatibility of the fluorocarbon blowing agent, trichlorotrifluoroethane, CFC-113, in the system. Suitable fluorocarbon solubility in the system is important for at least the following reasons:

(a) to insure metering of stoichiometric correct amounts of two component systems on commercial foam production equipment; and (b) to increase the amount of fluorocarbon blowing agent in the closed-cell structure of resultant rigid phenolic foams to produce optimum insulation properties.

While a variety of chlorofluoroalkane blowing agents have been used for phenolic systems in the past, none of the known systems which have been employed heretofore have been entirely satisfactory. In phenolic foam systems, if the fluorocarbon blowing agent is not completely soluble or miscible in the "premix" component of the system (i.e. resole resin, surfactant, fluorocarbon blowing agent or other additives), the insoluble portion of the fluorocarbon will separate as a distinct layer on the bottom of the "premix" component container during storage. When the "premix" component container, e.g. 55 gallon drum, is put into use for phenolic foam production, processing, foam appearance and physical property problems could arise because the "premix" component is not homogeneous. The resulting consequences of a non-homogeneous pre-mix are such as lack of uniformity of product, poor appearance and physical properties such as excessive density.

Fluorocarbons, as a class of insulating gases that are contained in the foam, exhibit the lowest thermal conductivity values when compared to other gases such as air, nitrogen, carbon dioxide, water vapor, etc. In many foam systems, fluorocarbons not only act as blowing agents to produce the foam by virtue of their volatility, but also are encapsulated or entrained in the closed cell structure of the rigid foam and are the major contributor to the low thermal conductivity properties of foams used in insulation applications.

If the required amount of fluorocarbon is not present in the resultant rigid foam due to insolubility of some of the fluorocarbon in the foam system then the processing characteristics of the foam system will change and desired foam appearance and physical properties, e. g. density, loadbearing, thermal conductivity, etc. would not be achieved. Therefore, it is necessary for the fluorocarbon to be homogeneously dispersed in the foamable resin system in order to obtain the desired results.

Accordingly, a need exists for an improved blowing agent for rigid phenolic foam systems which have the desired solubility, compatibility and stability and which does not adversely affect the resultant rigid foam properties.

SUMMARY OF THE INVENTION

In accordance with the invention, phenol formaldehyde foams are prepared using blends of (a) trichlorotrifluoroethane (CFC-113) and (b) dichlorotrifluoroethane (CFC-123 or CFC-123a). The desired ratio of CFC-123 or CFC-123a to CFC-113 is preferably in the range of 1:9 to 3:7, respectively and the total blowing agent blend is present in amounts of about 2 to 40 parts by weight based on the total weight of the resin. The phenol formaldehyde foam systems using this blowing agent blend exhibit improved solubility characteristics with no significant adverse effect on resultant rigid foam properties. We have found that this particular fluorocarbon blowing agent blend imparts significant improvement in the solubility characteristics of the phenolic foam systems. The increased solubility, in the foamable system of blends of (a) CFC-113 with (b) CFC-23 or CFC-123(a) or mixtures of CFC-123 and CFC-123a over CFC-113 without the (b) component (CFC-123 and/or CFC-123a) in the foamable systems, has been found to be substantial. Preparation of rigid phenolic foams using the system of the invention has shown that improved solubility of CFC-113 blends with CFC-123 or CFC-123a permits an important increase in the amount of blowing agent that can be dissolved in the formulation without imparting any significant adverse properties to physical characteristics of foams. A mixture of CFC-113 where CFC-123 or CFC-123a is a significant portion of the total composition has been found to result in improved blowing agent performance in phenol-formaldehyde foams compared to CFC-113 alone.

The use of CFC-123 (or CFC-123a, or both CFC-123 and CFC-123a), in combination with CFC-113 substantially improves resole resin solubility and mixed ingredient solution stability, prior to foaming. In addition, because of the lower molecular weight of CFC-123 (or CFC-123a) compared to CFC-113 better blowing agent efficiency will be realized per unit weight. Also, the lower boling points of CFC-123 and CFC-123a as compared to CFC-113 will result in a more ready conversion of dissolved blowing agent to released gaseous blowing agent by the exothermic phenolic resin polymerization. Because of the lower molecular weight and lower boiling point factors, a lower density foam will we realized. Bench-scale preparation of phenolic foams showed that, where CFC-123 and CFC-123a were part of the blowing agent mixture, significantly lower density foams resulted.

DESCRIPTION OF THE PREFERRED EMBODIMENT

In accordance with the invention, phenol formaldehyde foam systems may be compounded with fluorocarbon blowing agent that comprise a blend of (a) CFC-113 and (b) CFC-123 or CFC-123a, or mixtures of CFC-123 and CFC-123a to yield improved compatibility and solubility properties to the foamable composition. Advantageously, such properties are retained over long term storage periods. In the practice of the invention, a mixture of CFC-113 and CFC-123 and/or CFC-123a, where CFC-123 and/or CFC-123a is a significant portion of the total composition, and has been found to result in improved blowing agent performance in phenol-formaldehyde foams compared to systems where CFC-113 alone is used in lieu of, or in combination with, CFC-123a.

For example, a composition of CFC-113/CFC-123 (or CFC-123a) where the CFC-123 or CFC-123a constitutes 1–50% by weight, will be a superior blowing agent.

The use of CFC-123 (or CFC-123a, or both), in combination with CFC-113 improves resole resin solubility and mixed ingredient solution stability, prior to foaming. In addition, because of the lower molecular weight of CFC-123 (or CFC-123a (M.W. 153) compared to CFC-113 (M.W. 187.4) better blowing agent efficiency will be realized per unit weight. Also, the lower boiling points of CFC-123 (p.b. 27.1° C.) and CFC-123a (b.p. 28.2° C.) as compared to CFC-113 (b.p. 47.6° C.) will result in a more ready conversion of dissolved blowing agent to released gaseous blowing agent by the exothermic phenolic resin polymerization. Because of the lower molecular weight and lower boiling point factors, a lower density foam will be realized.

The blowing agent generally is present in the foamable composition in an amount which will produce substantially closed-cell phenolic foam having an initial low k factor. The amount of blowing agent may vary widely, but it generally ranges from about 5 percent to about 20 percent by weight of the foamable resin composition. An amount of blowing agent in the range of from about 5 percent to about 15 percent by weight of the foamable composition is typical. An amount of blowing agent in the range of 8–12% by weight based on the weight of the resin is preferred.

The invention is useful in the production of phenolic foam thermal insulation for widely varying domestic and industrial uses and is applicable to both free-rise (bunstock) and molded phenolic foam systems. The invention is particularly advantageous as a method of producing phenolic foams having excellent insulation properties from foamable compositions based on phenolic resoles produced from relatively low cost phenol and formaldehyde, preferably as paraformaldehyde. Phenolic foam produced according to the method of the invention exhibits not only a good initial k factor but also good k factor retention, unlike phenolic foams more typically known in the art. Thus, the method of the invention meets a long sought-after but heretofore unrealized goal of producing a phenolic foam having both good initial k factor and good k factor retention from phenolic resoles such as simple phenol formaldehyde resole and thereby represents a significant advancement in the phenolic foam art.

The invention will be further described by the following specific examples. It should be understood, however, that although these examples may describe in detail certain preferred operating conditions of the invention, they are given primarily for purposes of illustration and the invention in its broader aspects is not limited thereto.

EXAMPLE I

Phenolic foams were prepared by bench-scale mixing of a resole, a surfactant and a CFC blowing agent. The resole resin was Reichhold Chemicals, Inc. Foundrez 92-609, a (commercially available) modified phenol-formaldehyde resin, approximately 70% phenolic resin, with a specific gravity of 1.2, pH of 4.0–5.0 and a viscosity of 150–200 cps. at 25° C. The surfactant was Dow Corning 193, Dow Corning Corp., a low-viscosity silicone-glycol copolymer, with a specific gravity of 1.07 at 77° F., and a viscosity of 465 centistokes at 77° F. Resin, blowing agent and surfactant were premixed at low speed by a motor-driven paddle-type small stirrer. After addition of benzene sulfonic acid (75% in water) catalyst, the mixture was rapidly stirred for one minute and poured into an open container where the foam was allowed to fully expand, harden, and cure overnight at room temperature. Density determination of the foams showed that, where CFC-123 and CFC-123a were part of the blowing agent, significantly lower density foams resulted.

TABLE I

| Formulation | Parts by Weight (grams) | | |
| --- | --- | --- | --- |
| | 1 | 2 | 3 |
| Foundrez 92-609 | 100 | 100 | 100 |
| Dow Corning 193 | 1 | 1 | 1 |
| Genetron 113 | 20 | — | — |
| 50/50: CFC-113/123 (by weight) | — | 20 | — |
| 50/50: CFC-113/123a (by weight) | — | — | 20 |
| Benzene sulfonic acid (75% in water) | 20 | 20 | 20 |
| Start to rise (min.) | 3 | 1 | 1 |
| Tack free time (min.) | 10 | 8 | 9 |
| Free rise core foam density (lbs./cu. ft.) | 1.8 | 1.3 | 1.5 |

Various modifications to the foregoing will be apparent to one skilled in the art from the disclosure and teaching herein provided such modifications are not to be construed as limiting the invention except to the extent that a given limitation is set forth in the claims which follow.

What is claimed:

1. A mixture comprising a foamable rigid phenol formaldehyde resin and a fluorocarbon blowing agent system comprising a blend of wherein said blowing agent is selected from blends of (a) a fluorocarbon consisting of trichlorotrifluoroethane (CFC-113) and mixtures thereof with (b) dichlorotrifluoroethane, CFC-123 or CFC-123a, and mixtures thereof in a ratio of CFC-123 or CFC-123a to CFC-113 of about 1:9 to about 3:7 and wherein the total blowing agent is present in amounts of from about 2 to 40 parts by weight based on the weight of the phenol formaldehyde resin.

2. The mixture of claim 1 wherein (a) is a mixture of CFC-123 and CFC-123a.

3. The mixture of claim 1, wherein the ratio of CFC-113 to CFC-123 or CFC-123a or mixtures thereof 50:1 to 1:1.

* * * * *